United States Patent
Kuschk et al.

(10) Patent No.: US 12,449,512 B2
(45) Date of Patent: Oct. 21, 2025

(54) RADAR POINT CLOUD MULTIPATH REFLECTION COMPENSATION

(71) Applicant: GM Cruise Holdings LLC, San Francisco, CA (US)

(72) Inventors: Georg Kuschk, Garmisch-Partenkirchen (DE); Marc Unzueta Canals, Munich (DE); Michael Meyer, Munich (DE); Sven Möller, Lübbecke (DE)

(73) Assignee: GM Cruise Holdings LLC, San Francisco, CA (US)

( * ) Notice: Subject to any disclaimer, the term of this patent is extended or adjusted under 35 U.S.C. 154(b) by 311 days.

(21) Appl. No.: 17/899,762

(22) Filed: Aug. 31, 2022

(65) Prior Publication Data

US 2024/0036168 A1 Feb. 1, 2024

(30) Foreign Application Priority Data

Jul. 29, 2022 (EP) .................................... 22187788

(51) Int. Cl.
*G01S 7/41* (2006.01)
*B60W 60/00* (2020.01)
(Continued)

(52) U.S. Cl.
CPC .............. *G01S 7/417* (2013.01); *G01S 13/89* (2013.01); *G01S 13/931* (2013.01); *B60W 60/001* (2020.02); *B60W 2420/408* (2024.01)

(58) Field of Classification Search
CPC ........ G01S 7/417; G01S 13/89; G01S 13/931; G01S 7/4802; G01S 17/46; G01S 17/931;
(Continued)

(56) References Cited

U.S. PATENT DOCUMENTS 9,373,149 B2 * 6/2016 Abhyanker ............ G06Q 10/10
10,552,691 B2 * 2/2020 Li .......................... G01S 7/4808
(Continued)

FOREIGN PATENT DOCUMENTS

DE 102021001452 A1 5/2021

OTHER PUBLICATIONS

"Extended European Search Report for European Patent Application No. 22187788.9", Mailed Date: Jan. 23, 2023, 9 pages.
(Continued)

*Primary Examiner* — Mussa A Shaawat
(74) *Attorney, Agent, or Firm* — Honigman LLP; Matthew H. Szalach; Jonathan P. O'Brien

(57) ABSTRACT

A method and apparatus for implementing a method are disclosed. The method includes providing point cloud data to a machine learning algorithm, the point cloud data detected in the vicinity of an autonomous vehicle. The method further includes differentiating, via the machine learning algorithm, in the point cloud, data directly representing a location of a first object and data indirectly representing a location of a second object. The method includes transforming the data indirectly representing the location of the second object into data directly representing the location of the second object and generating corrected point cloud data based on the data directly representing the location of the first object and the data directly representing the location of the second object. The method includes outputting the corrected point cloud data to the autonomous vehicle.

20 Claims, 11 Drawing Sheets

(51) Int. Cl.
*G01S 13/89* (2006.01)
*G01S 13/931* (2020.01)

(58) Field of Classification Search
CPC ....... G01S 2013/462; G01S 2013/9316; G01S 2013/9323; G01S 13/46; B60W 60/001; B60W 2420/408
See application file for complete search history.

(56) References Cited

U.S. PATENT DOCUMENTS

| | | | | |
|---|---|---|---|---|
| 2019/0049987 | A1* | 2/2019 | Djuric | G06N 3/08 |
| 2020/0057160 | A1* | 2/2020 | Li | G01S 7/4802 |
| 2021/0056713 | A1* | 2/2021 | Rangesh | G01S 17/89 |
| 2021/0064890 | A1* | 3/2021 | Murveit | G05D 1/0212 |
| 2022/0198706 | A1* | 6/2022 | Su | G01C 21/3602 |
| 2023/0126333 | A1* | 4/2023 | Ali | G01S 7/403 |
| | | | | 701/25 |
| 2023/0206653 | A1* | 6/2023 | Sebastian | G01S 17/89 |
| | | | | 702/3 |
| 2023/0213643 | A1* | 7/2023 | Hwang | G06T 7/50 |
| | | | | 382/106 |
| 2023/0213646 | A1* | 7/2023 | Wilson et al. | G06V 10/25 |
| | | | | 342/179 |
| 2023/0273308 | A1* | 8/2023 | Wilson et al. | G01S 7/417 |
| | | | | 342/104 |
| 2023/0311930 | A1* | 10/2023 | Lasram | G01S 13/931 |
| | | | | 701/2 |
| 2023/0311932 | A1* | 10/2023 | Lasram | G07C 5/02 |

OTHER PUBLICATIONS

Qi, et al., "PointNet++: Deep Hierarchical Feature Learning on Point Sets in a Metric Space", In 31st Conference on Neural Information Processing Systems, Jan. 1, 2017, pp. 1-10.

* cited by examiner

RADAR POINT CLOUD MULTIPATH REFLECTION COMPENSATION

RELATED APPLICATION

This application claims priority to European Patent Application No. 22187788.9, filed on Jul. 29, 2022, and entitled "RADAR POINT CLOUD MULTIPATH REFLECTION COMPENSATION". The entirety of this application is incorporated herein by reference.

BACKGROUND

Autonomous vehicles are motorized vehicles that can operate without human control. FIG. 1A shows an exemplary autonomous vehicle 100 including system 101, which may include a plurality of sensor systems. The sensor systems include, but are not limited to, a light detection and ranging (lidar) sensor system, a camera sensor system, and a radio detection and ranging (radar) sensor system, amongst others. System 101 may employ its detection systems independently or concurrently with one another. Autonomous vehicles 100 can operate based upon sensor data output by these sensor systems 101. Systems 101 can be employed for sensing other objects (e.g., other vehicles, trees, walls, signs, road, etc.) in the environment 103 in which autonomous vehicle 100 is navigating.

As an autonomous vehicle 100 moves about environment 103, a system driving the vehicle may generate predictions of future paths of objects (e.g., vehicles, pedestrians, etc.) in the environment based upon data from the sensor system 101. The autonomous vehicle 100 generally makes navigation decisions based at least in part on these predictions. For instance, the autonomous vehicle 100 may select maneuvers to change direction to follow a road, pass neighboring vehicles, stop to avoid a collision, and so forth.

Radar and lidar sensor systems 101 of the autonomous vehicle 100 continuously collect data from the environment to make such decisions. The data collected may be referred to as a "point cloud," where each point in the cloud results from a reflection of a signal emitted by the autonomous vehicle's radar or lidar system 101 into the environment 103, which is then detected after the signal interacts with objects in the environment 103.

Much of the data in the point cloud is detected by system 101 after being directly reflected by a target object of interest 105 (e.g., a wall 105a, a tree 105b, another vehicle 105c, etc. and/or the street or road 107 in FIG. 1A) in environment 103. This "single path" data represents a signal having traversed a single path from the target object (e.g., 105a-105c) to the autonomous vehicle's detector without any additional reflections. System 101 can estimate the position of the target object (i.e., source of the directly reflected signal) using single path data via relatively simple geometrical considerations. That estimated position of the target object can be used to navigate the vehicle 100. For example, if the target object is a wall 105a, system 101 may use single path data to detect its position. A single path reflection from wall 105a can be used to detect the position of the wall, then steer the autonomous vehicle 100 to avoid the wall 105a.

However, some of the points in the point cloud may represent indirect reflections of system 101's emitted signal from target objects in environment 103. This happens when detected signals have undergone reflections from other objects (e.g., the wall 105a, tree 105b, other vehicle 105c, underlying road 107, etc.) between being reflected from a target object 105a-105c and collected by a detector in system 101. This "multipath" data results from a signal that traverses more than one path to a detector in system 101 after it has been reflected by a target object 105a-105c. A common source for multipath reflection, for example, is the underlying street 107 and/or walls 105a that may reflect signal that has already been reflected, for example, by vehicle 105c.

In some implementations, system 101 may not be able to determine a location of the object (e.g., 105a-105c) causing the primary reflection when it receives data only after secondary or multipath reflections. Because of this, many systems 101 will simply discard multipath data. In some cases, systems 101 will be unable to distinguish between multipath and single path data and, therefore, the multipath data will be incorrectly interpreted as single path data. In those cases, the multipath data may confound or obscure system 101's analysis of the environment 103. Either way, multipath data in a point cloud can degrade the resolution and/or limit the amount of useable data in the point cloud.

SUMMARY

The following is a brief summary of subject matter that is described in greater detail herein. This summary is not intended to be limiting as to the scope of the claims.

A computing device is disclosed. The computing device includes a processor and a memory that stores computer-readable instructions. The instructions, when executed by the processor, cause the processor to perform acts including providing point cloud data to a machine learning algorithm, the point cloud data detected in the vicinity of an autonomous vehicle. The acts further include differentiating, via the machine learning algorithm, in the point cloud, data directly representing a location of a first object and data indirectly representing a location of a second object. The acts include transforming the data indirectly representing the location of the second object into data directly representing the location of the second object and generating corrected point cloud data based on the data directly representing the location of the first object and the data directly representing the location of the second object. The acts include outputting the corrected point cloud data to the autonomous vehicle.

A method is also disclosed. The method includes providing point cloud data to a machine learning algorithm, the point cloud data detected in the vicinity of an autonomous vehicle. The method further includes differentiating, via the machine learning algorithm, in the point cloud, data directly representing a location of a first object and data indirectly representing a location of a second object. The method includes transforming the data indirectly representing the location of the second object into data directly representing the location of the second object and generating corrected point cloud data based on the data directly representing the location of the first object and the data directly representing the location of the second object. The method includes outputting the corrected point cloud data to the autonomous vehicle.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF DRAWINGS

FIG. 2C shows an example setup that may produce point cloud data 200 where a vehicle 105c causes a multipath (secondary) reflection via wall 105a;

DETAILED DESCRIPTION

Figure 1A:
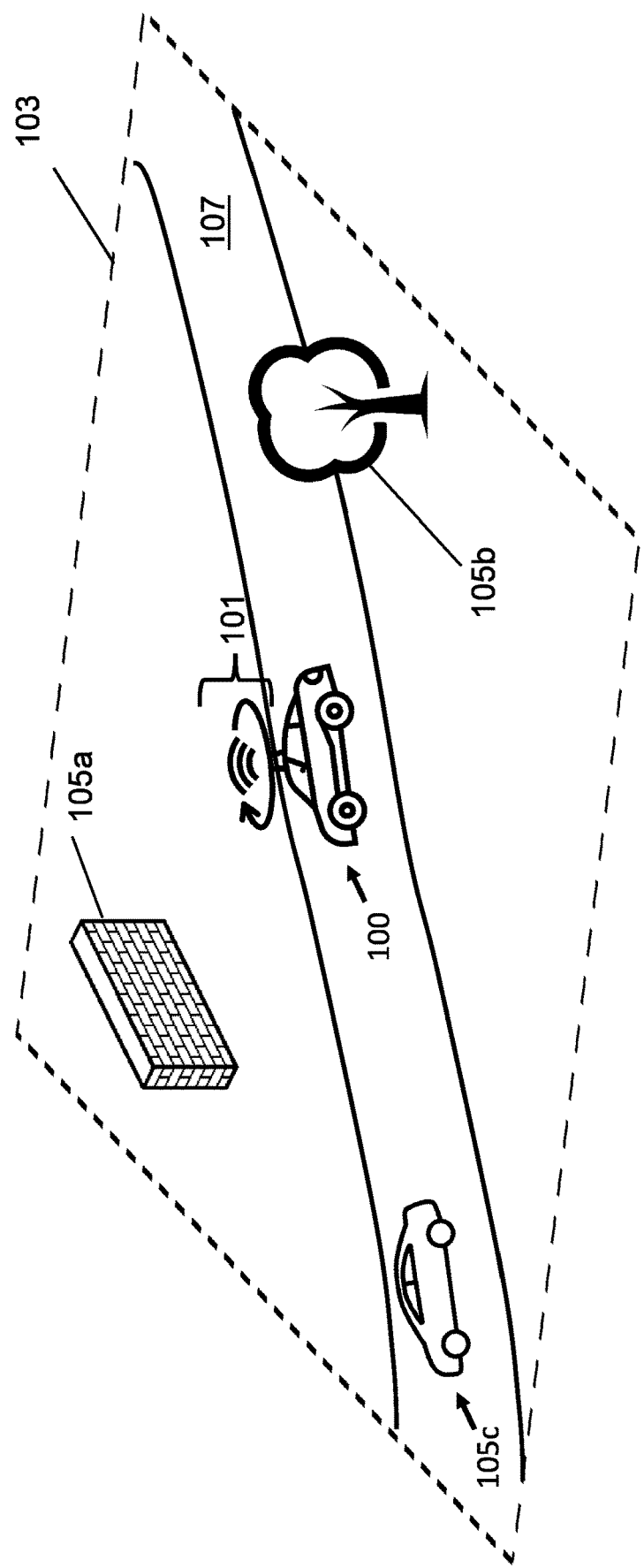
FIG. 1A shows an environment 103 in which an autonomous vehicle 100 may navigate.

Several illustrative embodiments will be described in detail with the understanding that the present disclosure merely exemplifies the general inventive concepts. Embodiments encompassing the general inventive concepts may take various forms and the general inventive concepts are not intended to be limited to the specific embodiments described herein.

Overview of the Disclosed Systems and Methods

Various technologies pertaining to navigating autonomous vehicles are now described with reference to the drawings, wherein like reference numerals are used to refer to like elements throughout. In the following description, for purposes of explanation, numerous specific details are set forth to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component", "system", "generator", and "application" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

Many of the examples set forth herein describe an autonomous vehicle receiving corrected point cloud data and then autonomously performing a driving maneuver based upon the corrected point cloud data. It is to be understood, however, that the correct point cloud data described herein can be employed in a variety of different scenarios, such as flight, in drone technologies, in monitoring technologies (e.g., security technologies), and so forth. Autonomous vehicles are set forth herein as one possible use case, and features of the claims are not to be limited to autonomous vehicles unless such claims explicitly recite an autonomous vehicle.

Overview of Exemplary Computing Device 150

Figure 1B:
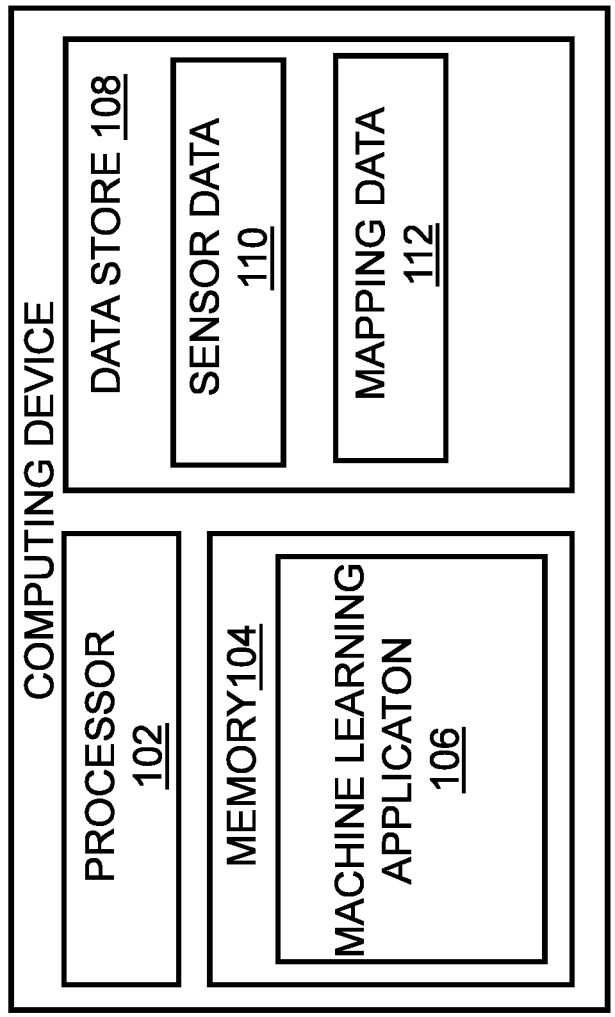
FIG. 1B illustrates a computing device 150 that may be employed by autonomous vehicle 100 according to aspects of the present disclosure.

FIG. 1B illustrates an exemplary computing device 150 that may be used in conjunction with system 101 in autonomous vehicle 100 in accordance with the present disclosure. Computing device 150 may be incorporated directly into system 101 or may operate separately from system 101. In the latter case, computing device 150 can interface with system 101 for obtaining sensor information from system 101.

Computing device 150 comprises a processor 102 and memory 104. Memory 104 has a machine learning application 106, e.g., one or more artificial neural network (ANN) applications, loaded therein. In general, the machine learning application 106 (when executed by the processor 102) is configured to implement machine learning algorithms described below using sensor data generated by sensor systems of autonomous vehicles and/or other sources. In particular, the machine learning application 106 can be trained to a) distinguish multipath reflections from single path reflections in a series of position data described below and b) correct one or more aspects of the multipath reflection data for use in navigation of the autonomous vehicle 100. More generally, machine learning application 106 can be trained, in exemplary procedures described below, to detect such features in a point cloud 200 and to use this detected information, along with other information from system 101 and other sources, to navigate autonomous vehicle 100 in environment 103.

The computing device 150 may further include a data store 108. The data store 108 may include a plurality of sensor data 110 generated by sensor systems of a plurality of autonomous vehicles and/or sensor data generated in system 101. The plurality of sensor data 110 can be indicative of positions of objects in driving environments (e.g., environment 103). For instance, the objects may include vehicles, bicycles, and pedestrians. The sensor data 110 may include data from objects of interest 105a-105c shown in environment 103 in FIG. 1A. The sensor data 110 may contain both single path and multipath reflection data from these and other objects in environment 103.

The data store 108 may further comprise mapping data 112. Mapping data 112 may comprise maps of driving environments (e.g., environment 103) which show the locations of various features and obstacles. Mapping data 112 may also include path plans for the autonomous vehicle with respect to the features on the maps. The path plans may be indicative of possible maneuvers that can be executed by an object at the positions reflected in one or more of the maps. For example, the mapping data 112 may include positions, size, and other information regarding objects of interest 105 (e.g., wall 105a, trees 105b, and other vehicles 105c, as shown in FIG. 1A). As discussed in more detail below, both the sensor data 110 and the mapping data 112 may be used by the machine learning application 106 to distinguish and correct multipath reflection data.

Point Cloud 200 and Multipath Data

Figure 2A:
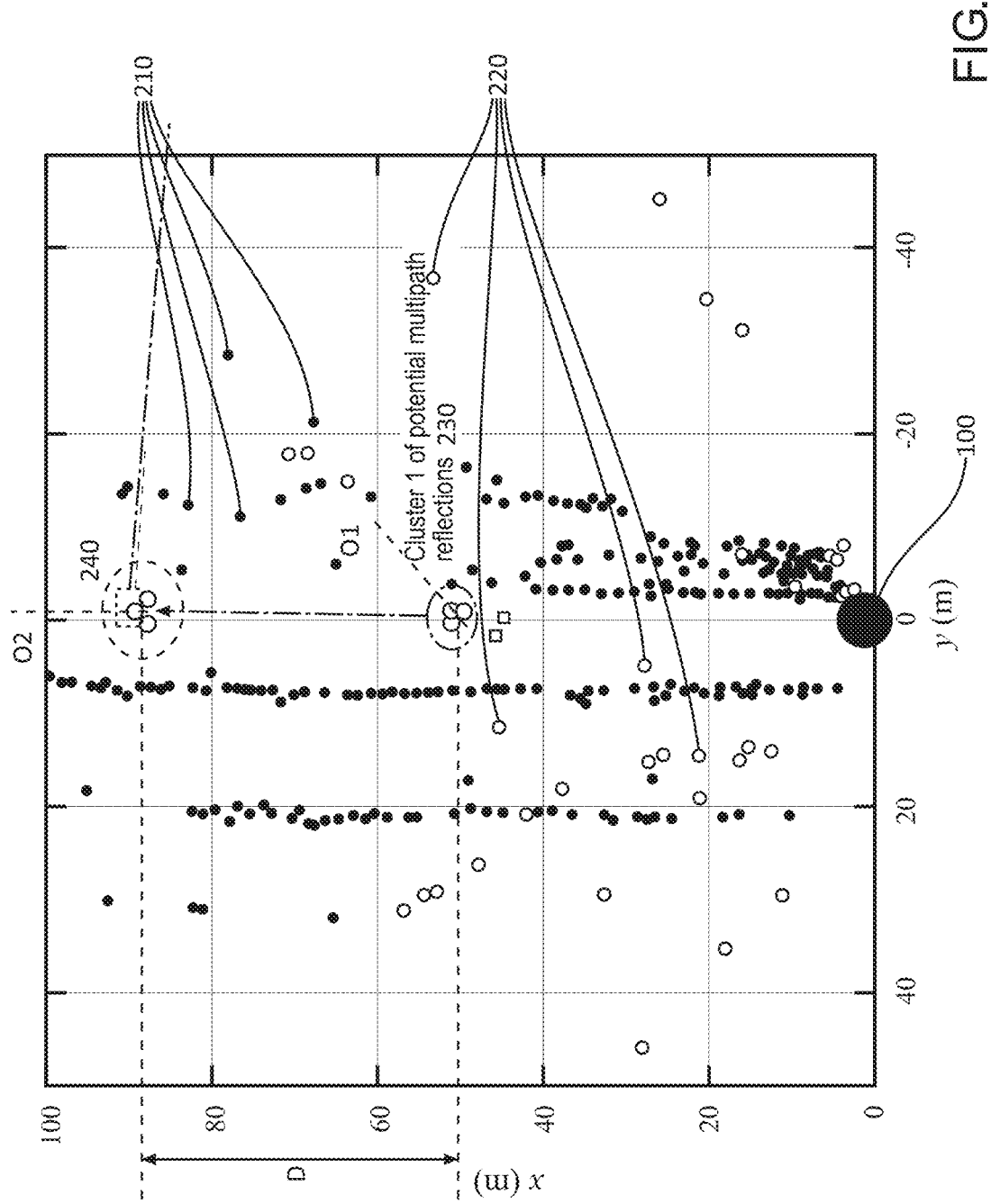
FIG. 2A shows exemplary point cloud data 200 that may be analyzed by the methods and devices according to the present disclosure via system 101.

FIG. 2A shows exemplary point cloud data 200 that may be analyzed by the methods and devices disclosed herein. X and Y axes in FIG. 2A represent distance from the location of autonomous vehicle 100. Each point (e.g., exemplary points 210) in the cloud 200 represents a detected signal by system 101 at its location estimated assuming each point derives from a single-path reflection. For a majority of points (e.g., including the series of points labeled 210), these assumed single path locations may accurately reflect the positions of the objects whose reflections they represent. Certain points, e.g., exemplary points 220, may be in motion. Such motion can be detected by system 101 collecting point cloud data 200 at different points in time, e.g., at first, second, and third points time $t_1$, $t_2$, and $t_3$. Motion of points 220 can be tracked over $t_1$, $t_2$, and $t_3$ to determine an apparent trajectory of the target objects associated with these points.

As discussed above, in some applications, points in cloud 200 may sometimes be assumed to result from single path reflections. However, analysis by system 150, in particular by its machine learning application 106 (or 306 below), may reveal point cloud 200 has a significant contribution from multipath reflections.

FIG. 2A illustrates a potential effect of a cluster 230 of potential multipath reflections on the point cloud 200 measurement. As shown in FIG. 2A, cluster 230 appears in the point cloud 200 to be approximately 50 meters in the X direction away from autonomous vehicle 100. If cluster 230 results from multipath reflections, however, this apparent position will be incorrect.

In the example, the position of the actual object 240 responsible for point cluster 230 is a distance D further away from autonomous vehicle 100 than cluster 230. This is because point cluster 230 results from a reflection of a signal emanated by system 101 off of a target object 105, then onto another object (e.g., road 107). FIG. 2A also shows how reflected cluster 230 may have a different orientation O1 than the actual object 240 that created the reflected cluster 230 (i.e., orientation O2). This orientation mismatch O1 vs. O2 may also need correcting. In other words, to correctly interpret point cloud data 200, it is important to: a) identify cluster 230 as resulting from a multipath reflection, and b) correct the point cloud data 200 such that cluster 230 is moved to its actual position 240 and has its correct orientation O2.

Figure 2B:
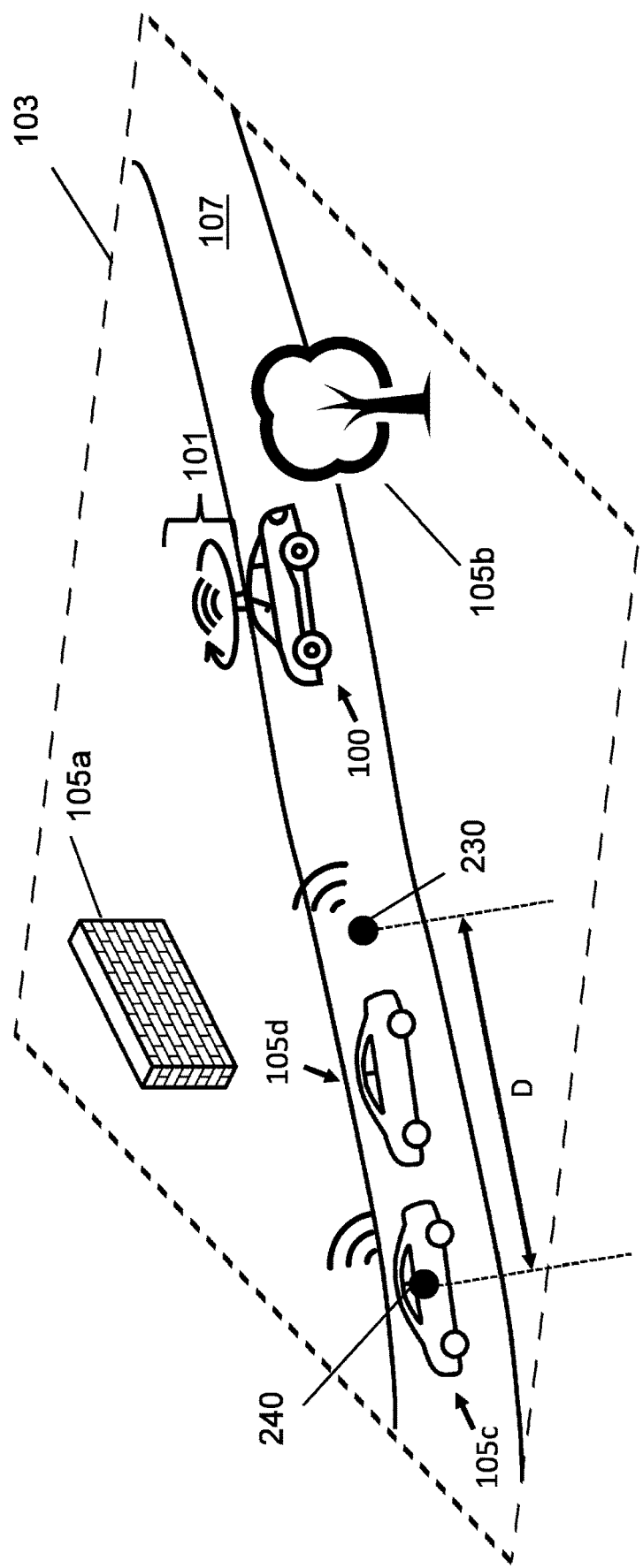
FIG. 2B shows an example setup that may produce point cloud data 200 where a vehicle 105c causes a multipath (secondary) reflection via street 107.
Figure 2C:
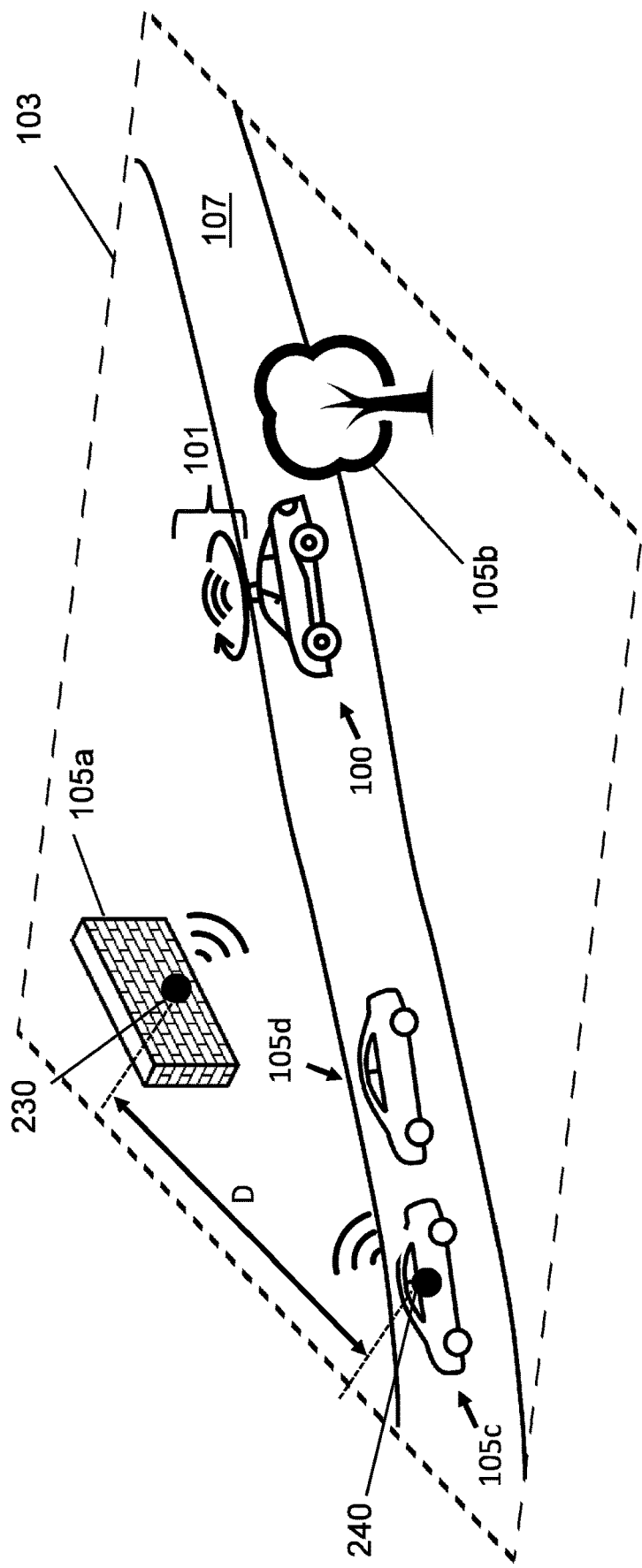

Though secondary reflections (e.g., cluster 230) may emanate from locations other than their apparent locations according to point cloud 200, these secondary reflections can still add valuable information to the analysis and/or training of machine learning application 106. FIGS. 2B and 2C provide examples illustrating that point.

In FIG. 2B, cluster 230 represents a secondary reflection from vehicle 105d forming cluster 240. More specifically, a signal is first sent from system 101. That signal reaches vehicle 105c and is reflected in cluster 240, show in FIG. 2B. The reflected signal from vehicle 105c then is reflected a second time by road 107, forming a secondary reflection as point cluster 230. That secondary reflection 230 is detected by system 101 as if it were emanating from the position of cluster 230 shown in FIG. 2B, which is a distance D from the actual source of the original reflection, vehicle 105c. In this way, system 101 detects a signal originally emanating from vehicle 105c despite that there is no direct line of sight between vehicle 100 and vehicle 105c due to vehicle 105d's obstruction. However, to understand that this signal emanates from vehicle 105c, machine learning application 106 needs to be trained to detect cluster 230 as a multipath reflection and to correct its apparent location to that of cluster 240. This process is described below.

FIG. 2C shows a similar multipath detection scheme for a reflection emanating from vehicle 105c. This time the signal from vehicle 105c is reflected from wall 105a rather than street 107. The scenario in FIG. 2C is similar to FIG. 2B, except that the detected cluster 230 is now closer to wall 105a rather than between vehicles 105d and 100. In this scenario, the detected cluster 230 is a different distance D from original reflected cluster 240. Just as in FIG. 2A, here system 101 detects a signal originally emanating from vehicle 105c despite there being no direct line of sight due to the obstruction of vehicle 105d. Machine learning application 106 needs to be trained to detect cluster 230 as a multipath reflection originally emanating from vehicle 105a and to correct its apparent location to that of cluster 240.

One of skill will appreciate that any number of such reflections are possible from any suitable object in environment 103. For example, other such reflections may occur from tree 105b, other walls (not shown) or other parts of street 107. Buildings, bridges, signs, and other structures may further cause such reflections. In principle, any of these reflections can provide data to system 101 for understanding the environment 103 and navigating vehicle 100. Although FIGS. 2B and 2C provide two specific examples, i.e., reflections from street 107 and wall 105a, respectively, it is to be understood than any such reflections are within the scope of the present disclosure. Each of these reflections can provide information that augments the navigation system 101's understanding of environment 103 and, therefore, enhances its maneuvering capabilities. Specific ways of detecting and interpreting such reflections are discussed in more detail below in the context of mapping environment 103. Using maps and labeled sensor data to train machine learning application 106 to detect and interpret this data is also discussed. Doing so augments the information system 101 can obtain from point cloud 200, in the sense that previous systems tended to discard or misinterpret such multipath data.

Multipath data may be distinguished from single path data based on several factors. These factors include, determining whether the apparent position (e.g., position of cluster 230 in FIGS. 2B and 2C) is unlikely or impossible if provided by a single path reflection. For example, when single path analysis indicates that cluster 230 occurs either at wall 105a or behind wall 105a (FIG. 2C), this may likely indicate that cluster 230 results from a reflection from wall 105a. Similarly, if single path analysis indicates that cluster 230 emanates from a portion of road 107 where there is no vehicle (FIG. 2B) and/or that occurs under vehicle 100, cluster 230 likely results from a multipath reflection.

Another factor that can allow distinguishing multipath from single path data is if motion of cluster 230 over time (e.g., $t_1$, $t_2$, and $t_3$ above) does not track the likely motion of an object purportedly represented by cluster 230. For example, cluster 230 may appear to represent wall 105*a* according to mapping, yet also appear to move consistently like a vehicle (e.g., as would be the situation represented by FIG. 2B). In that case, cluster 230 likely represents multipath data emanating from a vehicle, not single path data from a stationary wall 105*a*. These and other relations will be explored below in the context of training machine learning application 106 (and variants within the present disclosure) to distinguish between multipath and single path reflective sources.

Systems and Methods for Interpreting Multipath Data Training and Application System 300

Figure 3:
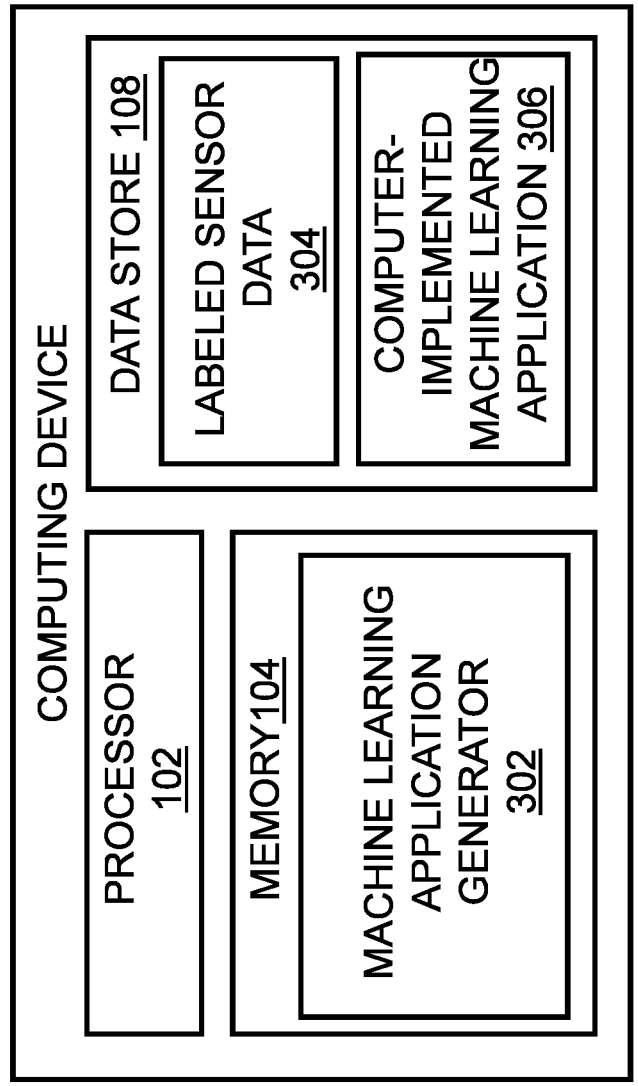
FIG. 3 illustrates another computing device 300 that may be employed by autonomous vehicle 100 according to the present disclosure.

FIG. 3 shows another exemplary computing device 300 (e.g., a modification of exemplary computing device 150) that may, for example, detect and correct multipath data such as cluster 230 data in point cloud 200. As shown in FIG. 3, memory 104 of the computing device 300 includes a machine learning application generator 302. In general, the machine learning application generator 302 (when executed by the processor 102) is configured to generate a computer-implemented machine learning application 306 based upon sensor data that has been trained by generator 302 to detect and correct multipath data.

Note that, although FIG. 3 shows machine learning application generator 302 and machine learning application 306 on the same device (i.e., device 300), this does not need to be the case. Implementations consistent with the present disclosure may run machine learning application generator 302 separately and apart from the machine learning application 306. That is, generator 302 and application 306 may run on a different platform, using a different processor, and/or at a different time. For example, generator 302 may be run on a server to generate application 306 for a processor 102 run on a system 101 that is attached to an autonomous vehicle 100. The server may be separate and apart from the autonomous vehicle 100. Application 306 may be generated as source code or as executable code, and any suitable combination of the two. Although FIG. 3 represents a specific implementation, it is to be understood that all such variations are within the scope of the present disclosure.

Specific implementations of application 306 will be discussed in more detail below. However, it is to be understood that one advantageous aspect of application 306 for this application includes a graph neural network (GNN). GNNs are particularly well suited for analyzing graph data structures. In a GNN, layers of graph convolutions operate on points in the point cloud 200. Various layers in the GNN may operate as graph convolutions on points in the point cloud 200. The point cloud 200 itself may be input to the GNN. The GNN input may also include feature vectors for each point in the point cloud 200. These feature vectors may encompass any of the variables described herein, and particularly the variables described below in the context of the labeled data 304 and mapping data 112 for training application 306.

The graphs used by the GNN may include actual mapping of physical data, as well as labels that indicate features in the physical data as determined via analysis and mapping. One such feature can be detection of multipath data and differentiation of multipath data from single path data in physically acquired data from environment 103. In particular, GNN models can represent data structures via large multi-layer graphs where connections between data points on the graphs can be determined or trained based on known correlations in the actual data labeling, as discussed in more detail below.

Labeled Data 304 for Training Application 306—Feature Vector (V)

The data store 108 of the computing device 300 comprises labeled sensor data 304 corresponding to both single path and multipath data (as discussed in the context of FIGS. 2B and 2C above). Labeled data 304 is "labeled" in the sense that it has a known correlation with known structural features of environment 103. For example, labeled data 304 may include a radar signature of target objects measured by autonomous vehicles 100 for target objects 105*a*-105*c*.

This labeled data 304 may comprise a plurality of sensor data (e.g., the plurality of sensor data 110) generated by sensor systems of a plurality of autonomous vehicles and maneuvers assigned to the plurality of sensor data. In an example, the labeled sensor data 304 may include first sensor data that is indicative of positions of an object at sequential timesteps in a time period and a first maneuver label (e.g., straight, right turn, left turn, etc.) assigned to the first sensor data.

The labeled data 304 may also include data described in the GNN feature vector described above. It may include the location of the point in the point cloud 200 as a main feature. This may be a location according to a single path analysis, an assumed location, or a corrected location based on multipath analysis. Another variable feature vector V may include is the radar cross section (RCS) of an object associated with a point in the point cloud. This can be a measured magnitude of reflection from that object. Alternatively, it can be an estimated maximal RCS from a single path reflection. In the latter case, RCS can be compared with the measured value to determine a degree of multipath reflection. Another variable that may be included in the feature vector V is a trajectory and/or velocity of the point in the cloud 200. As described below, this trajectory may be measured over time. It may be used to determine whether an assigned location of the object associated with the point in the point cloud 200 makes sense. For example, if the point is assigned to the location of a wall 105*a*, it should not be moving, etc. Another variable may be the number of reflections as determined by a physical technique such as polarimetry. An exemplary feature vector V assigned to each point in point cloud 200 may have the following form: V(location, RCS, trajectory, number of reflections).

Feature vector V and other aspects of data labeling may include variables not readily understood by humans. For example, in training, generator 302 may determine its own variables to track based on correlations it observes between important features and those variables in the labeled data 304 training set. It is important to note that some of the more predictive variables may be quantities that represent amalgams or combinations of other variables not readily apparent or amenable to human analysis. Such variables and/or determinations should be considered within the scope of the present disclosure.

Machine learning application generator 302 may be trained on labeled sensor data 304 including any of the variables in feature vector data V described above. Machine learning application generator 302 may use mapping data 112 that maps out environment 103 in application training. This mapping data 112 may include locations of target objects such as wall 105*a* and tree 105*b*. Mapping data 112 may help the machine learning application generator 302 build into the application 306 where reflections are most likely to occur (e.g., at or near locations of wall 105*a* in FIGS. 2B and 2C). As discussed above, once mapping of wall 105a is known, any apparent position derived from point cloud 200 that would place a target object on the other side of wall 105a from the autonomous vehicle is likely an indication that the data indicates a reflection.

Labeled data 304 may also include data that shows how environment 103 evolves (or not) with time. For example, as wall 105a is likely to remain stationary, labeled data 304 may include measured reflections from wall 105a at different time frames demonstrating that its position does not change over the time frames, even while the autonomous vehicle 100 does change position. The same type of data may be included in labeled data 304 for any of the objects known to be in environment 103.

It may be advantageous to include as large and as varied a data set in the labeled sensor data 304 as possible to train application 306. This includes as much time resolved data as possible. Moreover, including labeled sensor data 304 from different sources, e.g., collected from different autonomous vehicles 100 traversing environment 103, can improve the mapping, and thereby the training of the net 306. Data from multiple autonomous vehicles 100 can be combined in a structured data set (e.g., labeled sensor data 304) once the data is verified. Using data from multiple sources (e.g., multiple autonomous vehicles 100) can improve the quality and the accuracy of training application 306, particularly respect to individual features in the map (e.g., wall 105a). Each data set from each autonomous vehicle 100 may contain labeling of four locations of wall 105a. Mapping data 112 could be an average location of wall 105a, combining the accuracy of all measurements made by different vehicles 100. Individual locations for objects of interest could be located statically. They could also be tracked over time both to improve accuracy and to ensure that features in the map are stationary and not transient objects (e.g., vehicles) that will be of no use the future vehicles navigating environment 103.

Mapping 112 and label data 304 can include maps or feature vectors V created using polarimetry, or the interpretation of polarized transverse waves (e.g., electromagnetic, radio or light waves). Polarimetry can resolve electromagnetic waves that have been reflected or diffracted to characterize the object doing the reflecting or refracting. In this case, mapping that would be incorporated into label data 304. Polarimetry can help generator 302 consider wave polarization to improve representation of target objects (e.g., wall 105a) in mapping/modeling. It can also be used to determine or enhance understanding of orientation of objects (e.g., help resolve differences in orientation of clusters 230 and 250 shown in FIG. 2). When system 101 uses circularly polarized antenna, for example, a number of bounces of the received signal can further be used and incorporated into mapping and labeled data 304. The bounces can be determined by analyzing chirality of circularly polarized waves alternates with each reflection. In this technique, additional information can be derived from determining whether reflections have occurred, how many times they reflections have occurred, whether the reflections have occurred in odd number of times or even number of times and based on a shape change of a wave (e.g., from circular or non-circular, or vice versa). Incorporating this information into V, mapping data 112, and labeled data 304 can improve the resolution of objects in the maps, as well improve the accuracy of the application generated by the machine learning application generator 302.

Mapping data 112 and label data 304 can be collected from live systems 101 attached to autonomous vehicles 100 deployed in environment 103. In this case, the mapping 112 and labeled data 304 can be updated regularly and often. As discussed above, the more and the better the data involved in building the more accurate application 106 will be. Mapping may incorporate data from sources outside a network of autonomous vehicles. For example, mapping may include information from surveys, municipalities, surveyors, agencies, etc. Mapping 112 may incorporate information from stationary cameras and/or stationary radar/lidar systems as well as those incorporated into navigation systems 101 on autonomous vehicles 100.

In general, it can be advantageous to allow the training process to identify features that mark and distinguish multipath data from single path data. These features can be identified via the application itself 306, particularly if the application 306 is well suited to the task of interpreting graph sets of data (e.g., incorporates a GNN).

Mapping data 112 and label data 304 can include data from multipath reflections, e.g., those illustrated in FIGS. 2B and 2C. Including multipath labeled data 304 helps generator 302 train application 306 to identify and correct multipath data. For example, labeled data 304 can include multipath reflections of objects (e.g., vehicles 105c) from wall 105a, street 107, and other objects in environment 103. Labels of multipath labeled data 304 help the training process learn to identify such data. The training process can include identification of multipath data also by, for example, comparing position data associated with the detected reflection with position of known objects in the environment 103, e.g., according to predetermined mapping. If a position based on reflection data is unrealistic (e.g., inside wall 158 or street 107), the reflection may be labeled multipath during training. Another example is when an object detected via reflection is apparently moving like a vehicle over time, but appears, from the same reflection data, to be positioned where there is no road according to the mapping data 112. In this case, the data may be assumed to represent a multipath reflection other vehicle and labeled as such. Multipath labeled data 304 can also include explicit identifiers that mark data 304 as multipath, including the results of polarimetry measurements described above.

Application 304 and application 306 may correct multipath data in a number of ways. One of the most common is to reassign a new position to multipath data once it has been detected as such. For example, in FIG. 2B, cluster data 230 in point cloud 200 may have been determined to be a multipath reflection corresponding to vehicle 105c, rather than a single path reflection corresponding to road 107. Subsequently, the position of this multipath reflection is corrected in the labeled data 304 (e.g., in feature vector V associated with the cluster data 230) to correspond to the position of vehicle 105c. This can be done by changing the saved location by the distance D shown in FIG. 2B. Similarly, once cluster data 230 has been determined to represent vehicle 105c instead of wall 105a (FIG. 2C), its position can be moved by distance D do the correct location. It may be advantageous to include this entire correction process in the training set that generator 302 uses to train application 306. That way, application 306 learns how to detect and correct multipath data encountered in its analysis of environment 103 via system 101.

Machine Learning Application 306

As shown in FIG. 3, the data store 108 includes the computer implemented machine learning application 306. Machine learning application 306 may be trained by machine learning application generator 302 using any of the data described herein, including labeled sensor data 304 and mapping data 112. Note that machine learning application 306 may correspond to application 106 discussed above and include any of the features of application 106.

Machine learning application 306 may be trained to output an indication of a maneuver that an object in a driving environment of an autonomous vehicle is predicted to execute based upon sensor data generated by sensor systems of the autonomous vehicle. Computing device 100 may generate the machine learning application 306 based upon the labeled sensor data 304, as described above. In particular, the application 306 may be trained to detect multipath reflected data in environment 103 and to correct that data.

Machine learning application 306 may include a GNN, another artificial neutral network (ANN), a deep neural network (DNN), a recurrent neural network (RNN), a long short-term memory (LSTM) RNN, or a convolutional neural network (CNN). The machine learning application 306 may also be or include a support vector machine (SVM), a Bayesian classifier, or other suitable classifier. Furthermore, the machine learning application 306 may be or include a decision tree or a random forest.

Machine learning application 306 may comprise nodes and edges that couple nodes in the machine learning application 306. Each edge can be assigned a learned weight, wherein the learned weight can be learned using a supervised or semi-supervised learning procedure. Accordingly, a learned weight assigned to an edge can be influenced by a plurality of sensor data from a plurality of autonomous vehicles. It can be assigned weight based on a determination of whether the data in the point cloud 200 corresponds to single or multipath reflection data. The machine learning application 306 may take sensor data generated by an autonomous vehicle as input. The sensor data may be indicative of an object in a driving environment of the autonomous vehicle. The machine learning application 306 outputs an indication of a maneuver that the object is predicted to execute based upon learned weights of the edges and the sensor data.

The machine learning application 306 may be configured to generate a probability distribution over possible maneuvers that can be executed by an object in a driving environment. For instance, if the possible maneuvers include a first maneuver and a second maneuver, the machine learning application 306 may output a first probability that the object is to execute the first maneuver and a second probability that the object is to execute the second maneuver.

Figure 4:
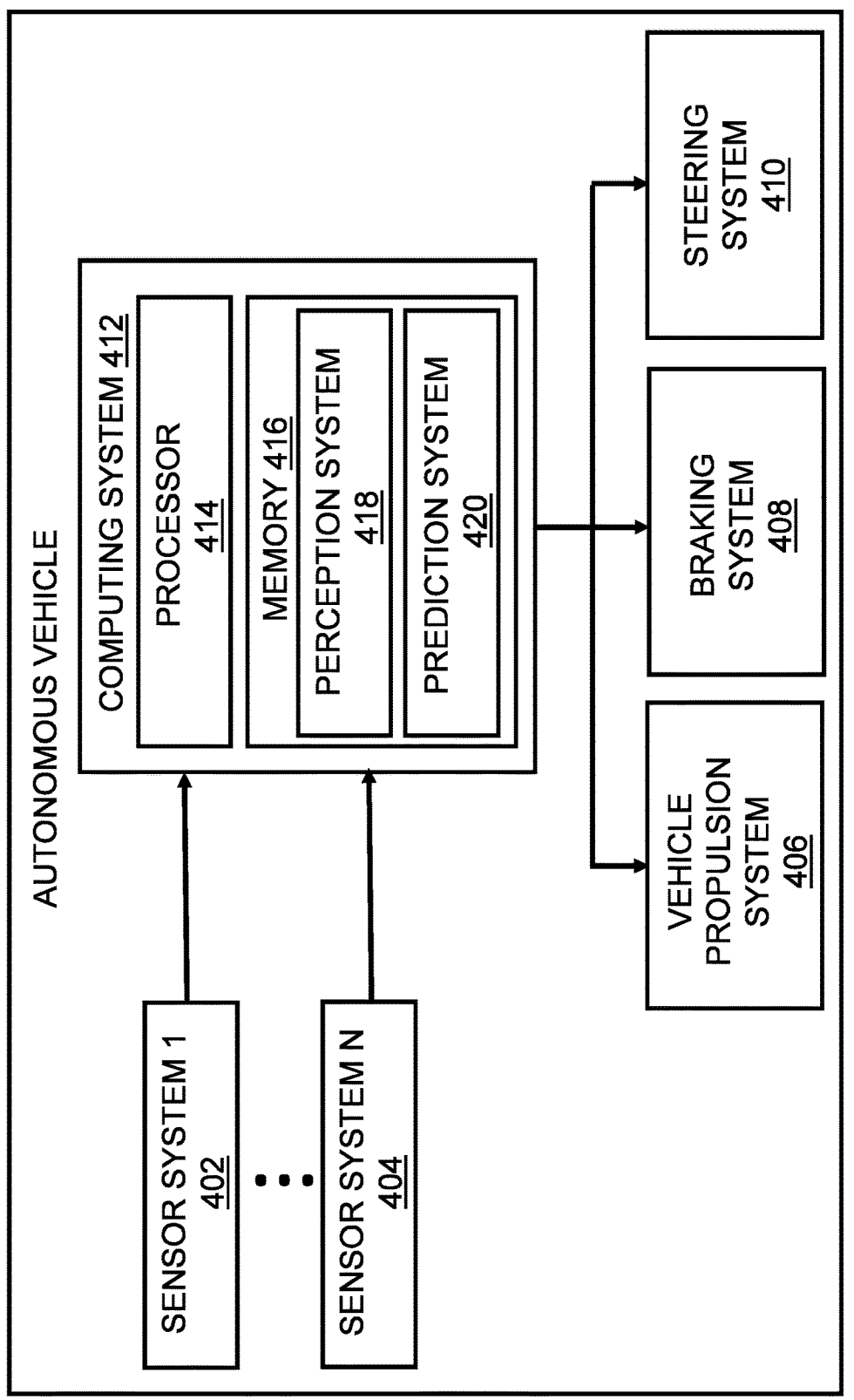
FIG. 4 illustrates an autonomous vehicle 400 that may be used according to the present disclosure.

FIG. 4 shows a schematic of an autonomous vehicle 400 that may be used with the present disclosure. Autonomous vehicle 400 may be, for example, the same autonomous vehicle 100 illustrated in FIGS. 1A, 2B, and 2C. Autonomous vehicle 400 can navigate about roadways without human conduction based upon sensor data (i.e., sensor signals) outputted by sensor systems of the autonomous vehicle 400.

Autonomous vehicle 400 includes sensor systems, namely, a sensor system 1 402 . . . and a sensor system N 404, where N can be substantially any integer greater than 1 (collectively referred to herein as sensor systems 402-404). Sensor systems 402-404 can include different types of sensors, any types of sensors disclosed herein, and are arranged about the autonomous vehicle 400. For example, the sensor system 1 402 may be a radar sensor system and the sensor system N 404 may be a camera sensor (image) system. Other exemplary sensor systems included in the sensor systems 402-404 can include lidar sensor systems, satellite-based radio navigation sensor systems (e.g., global positioning system (GPS) sensor systems), sonar sensor systems, infrared sensor systems, and the like. Sensor systems 402-404 generate (i.e., output) sensor data. For instance, the radar sensor systems can generate radar sensor data, the lidar sensor systems can generate lidar sensor data, the camera sensor systems can generate camera sensor data, etc. All of these systems can contribute data to feature vector V and, more generally, labeled data 304 and mapping data 112.

Autonomous vehicle 400 further includes several mechanical systems that are used to effectuate motion of the autonomous vehicle 400. For instance, the mechanical systems can include, but are not limited to, vehicle propulsion system 406, braking system 408, and steering system 410 (collectively, "mechanical systems 406-410"). The vehicle propulsion system 406 may be an electric motor, an internal combustion engine, or a combination thereof. The braking system 408 can include an engine brake, brake pads, actuators, and/or any other suitable componentry that is configured to assist in decelerating the autonomous vehicle 400. The steering system 410 includes suitable componentry that is configured to control the direction of movement of the autonomous vehicle 400.

The autonomous vehicle 400 further comprises a computing system 412. The computing system 412 comprises a processor 414 and memory 416. The memory 416 may have a perception system 418 and a prediction system 420 loaded therein. In general, the perception system 418 (when executed by the processor 414) is configured to facilitate detection of objects in driving environments of the autonomous vehicle 400. The prediction system 420 (when executed by the processor 414) is configured to generate predictions of future paths of objects in the driving environment of the autonomous vehicle 400.

Figure 5:
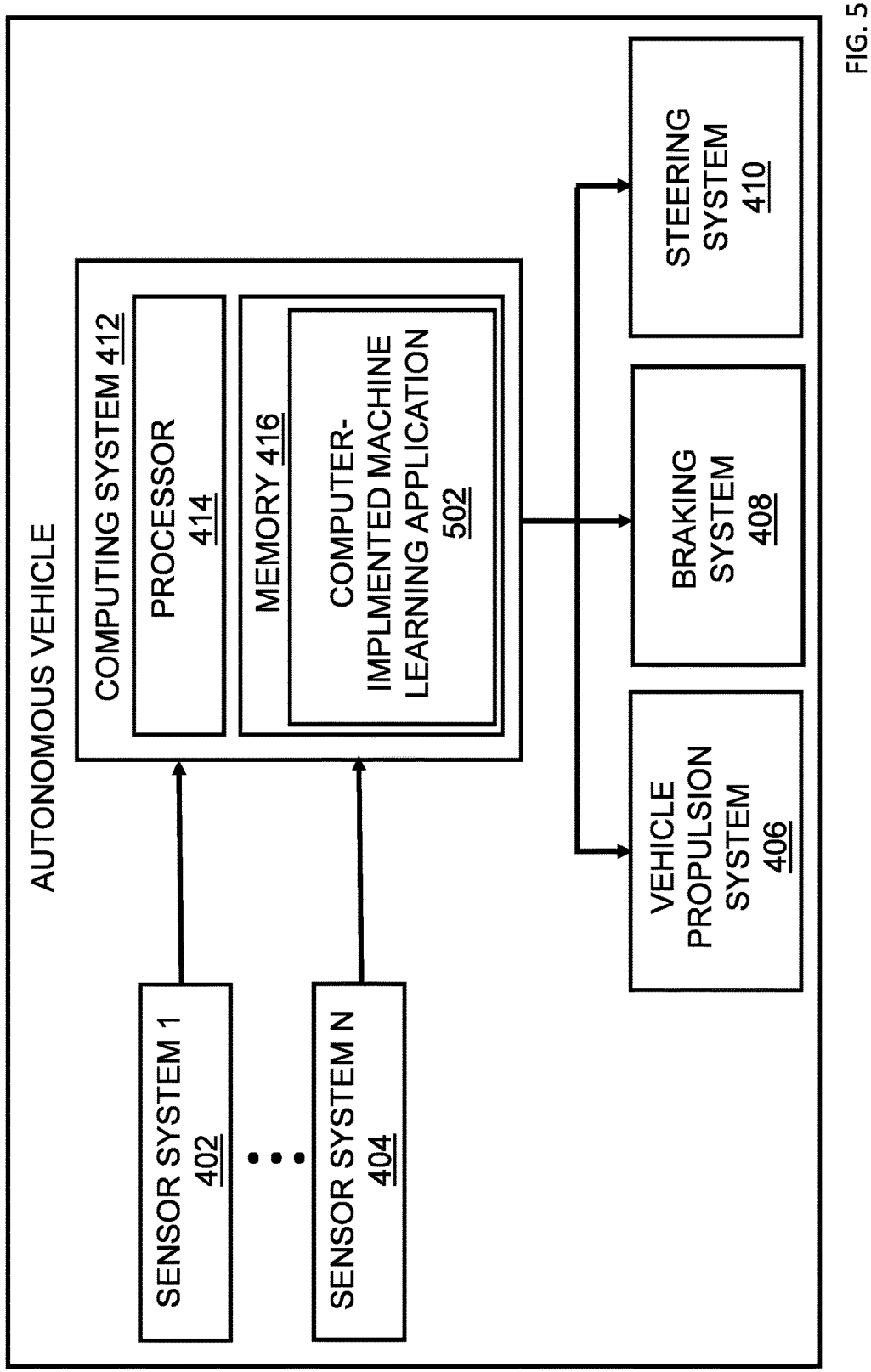
FIG. 5 illustrates another autonomous vehicle 500 that may be used according to the present disclosure.

FIG. 5 illustrates a variation 500 of autonomous vehicle 400 according to the present disclosure. Autonomous 500 includes the sensor systems 402-404, the mechanical systems 406-410, and the computing system 412 (including the processor 414, the memory 416, the perception system 418, and the prediction system 420).

As depicted in FIG. 5, the memory 416 of the autonomous vehicle 500 further comprises a computer-implemented machine learning application 502. In an example, the machine learning application 502 may include the machine learning application 306 or application 106 described above. The machine learning applications 306 and 106 may also include the machine learning application 502.

Machine learning application 502 may be part of the prediction system 420. The computing system 412 of the autonomous vehicle 500 may provide sensor data generated by the sensor systems 402-404 as input to the machine learning application 502. The sensor data is indicative of an object in a driving environment of the autonomous vehicle 500. The machine learning application 502 may then output an indication of a maneuver that the object is predicted to execute based in part upon the sensor data.

With reference to FIGS. 1A-5, operation of the computing devices 150, 300, and 412 and the autonomous vehicles 100, 400, or 500 is as follows. Computing devices 150, 300, and 412 receive sensor data generated by the sensor systems 402-404 of the autonomous vehicles 400 and 500. The sensor data is indicative of positions of an object in driving environment 103 of the autonomous vehicle 100, 400, or 500 at sequential timesteps. In a non-limiting example, the object may be a vehicle, such as a car, a truck, or a motorcycle, a bicycle, or a pedestrian or any of the objects of interest 105a-105c shown in FIG. 1A. In an embodiment, the time period may range from 1 to 6 seconds. For instance, the time period may range from 1.5 to 5.5 seconds, from 2 to 4 seconds, or from 3 to 3.5. The sequential timesteps may occur every 0.05 to 0.2 seconds. For instance, the sequential timesteps may occur every 0.1 to 0.18 seconds, every 0.12 to 0.16 seconds, or every 0.13 to 0.15 seconds.

The machine learning application 106 executing on the computing devices 150, 300, and 412 then identifies candidate path plans for the object in the driving environment of the autonomous vehicles 100, 400, or 500 based upon a position of the object detected based on the sensor data from the sensor systems 402-404. Each candidate path plan in the candidate path plans is indicative of a possible maneuver being executed by the object during the time period. For instance, a first candidate path plan may be executing a left turn and a second candidate path plan may be executing a left lane change. In an example, the candidate path plans may correspond to lanes of a road.

The machine learning application 106 may identify the candidate path plans further based upon the mapping data 112. More specifically, the machine learning application 106 may execute a search over the mapping data 112 based upon the positions of the object indicated by the sensor data. The search produces search results, wherein the search results include the candidate path plans. Mapping data 112 and sensor data 110 (or 304) may include corrected multipath data that identifies objects (e.g., vehicle 105c in FIG. 2B) that may not be in the direct line of sight of autonomous vehicle 100, 400, or 500. The machine learning application 106 then determines paths via a weighted directed graph. Subsequently, the machine learning application generator 302 may generate the computer-implemented machine learning application 306 (described above) based upon the sensor data and the paths generated by the machine learning application 106. The machine learning application 306 is configured to predict maneuvers that objects in driving environments of autonomous vehicles are to perform.

The computing device 150 may cause the machine learning application 306 (or application 502) to be loaded in the memory 416 of the computing system 412 of the autonomous vehicle 100, 400, or 500. As the autonomous vehicle 100, 400, or 500 operates, the sensor systems 402-404 generate second sensor data. The second sensor data may be indicative of a second object in the driving environment of the autonomous vehicle 400 (or a second driving environment of the autonomous vehicle 400). The computing system 412 of the autonomous vehicle 100, 400, or 500 receives the second sensor data. The computing system 412 provides the second sensor data as input to the machine learning application 502 described above. The machine learning application 502 outputs an indication of a maneuver that the second object is predicted to execute based upon the second sensor data. In an embodiment, the maneuver that the second object is predicted to execute may occur within a time period that extends 6 to 10 seconds from a time at which the computing system 412 receives the second sensor data. For instance, the time period may extend from 6.5 to 9 seconds, from 7 to 8.5 seconds, or from 7.5 to 8 seconds.

The computing system 412 of the autonomous vehicle 100, 400, or 500 then controls at least one of the vehicle propulsion system 406, the braking system 408, or the steering system 410 based upon the indication of the maneuver that the second object is predicted to execute. More specifically, the computing system 412 of the autonomous vehicle 100, 400, or 500 may control at least one of the vehicle propulsion system 406, the braking system 408, or the steering system 410 to execute a second maneuver based upon the indication of the maneuver that the second object is predicted to execute. For instance, the second maneuver may be maintaining a straight heading, a left lane change, a right lane change, a left turn, a right turn, or remaining stationary.

Figure 6:
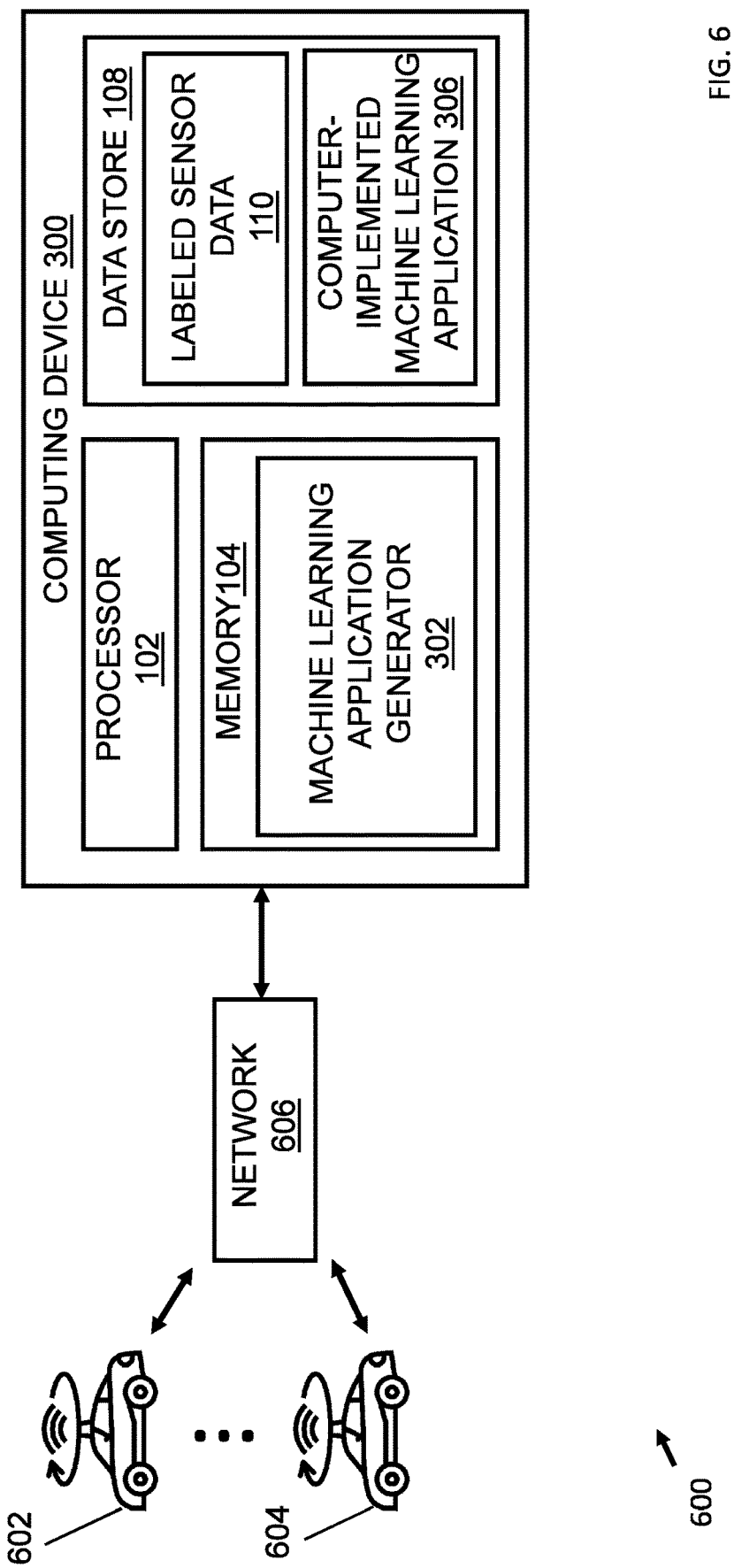
FIG. 6 illustrates a network environment 600 that may be used according to the present disclosure.

FIG. 6 illustrates an exemplary computing network environment 600 for autonomous vehicles 100, 400, or 500. The computing environment 600 includes the computing device 300 described above. The computing environment 600 also includes a plurality of autonomous vehicles, namely an autonomous vehicle 1 602, . . . , and an autonomous vehicle P 604, where P can be substantially any integer greater than 1. The autonomous vehicle 400 described above may be included in the plurality of autonomous vehicles 602-604. Furthermore, each autonomous vehicle in the plurality of autonomous vehicles 602-604 may include components similar or identical to the components of the autonomous vehicle 400 described above.

The plurality of autonomous vehicles 602-604 and the computing device 300 are in communication via a network 606 (or several networks). As the plurality of autonomous vehicles 602-604 move about driving environments, a plurality of sensor systems of the plurality of autonomous vehicles 602-604 generate a plurality of sensor data. The plurality of autonomous vehicles 602-604 may transmit the plurality of sensor data to the computing device 300. The computing device 300 (by way of the machine learning application generator 302) may generate the machine learning application 306 and/or the machine learning application 502 based upon the labeled sensor data 304.

It is to be understood that the above-described process may be employed many times to label many different sets of sensor data generated by the plurality of sensor systems of the plurality of autonomous vehicles 602-604. Furthermore, although the machine learning application 106 and the machine learning application generator 302 are described as executing on the computing device 100, it is to be understood that the machine learning application 106 and the machine learning application generator 302 may execute on separate computing devices.

Implementing Aspects of the Present Disclosure

Figure 7:
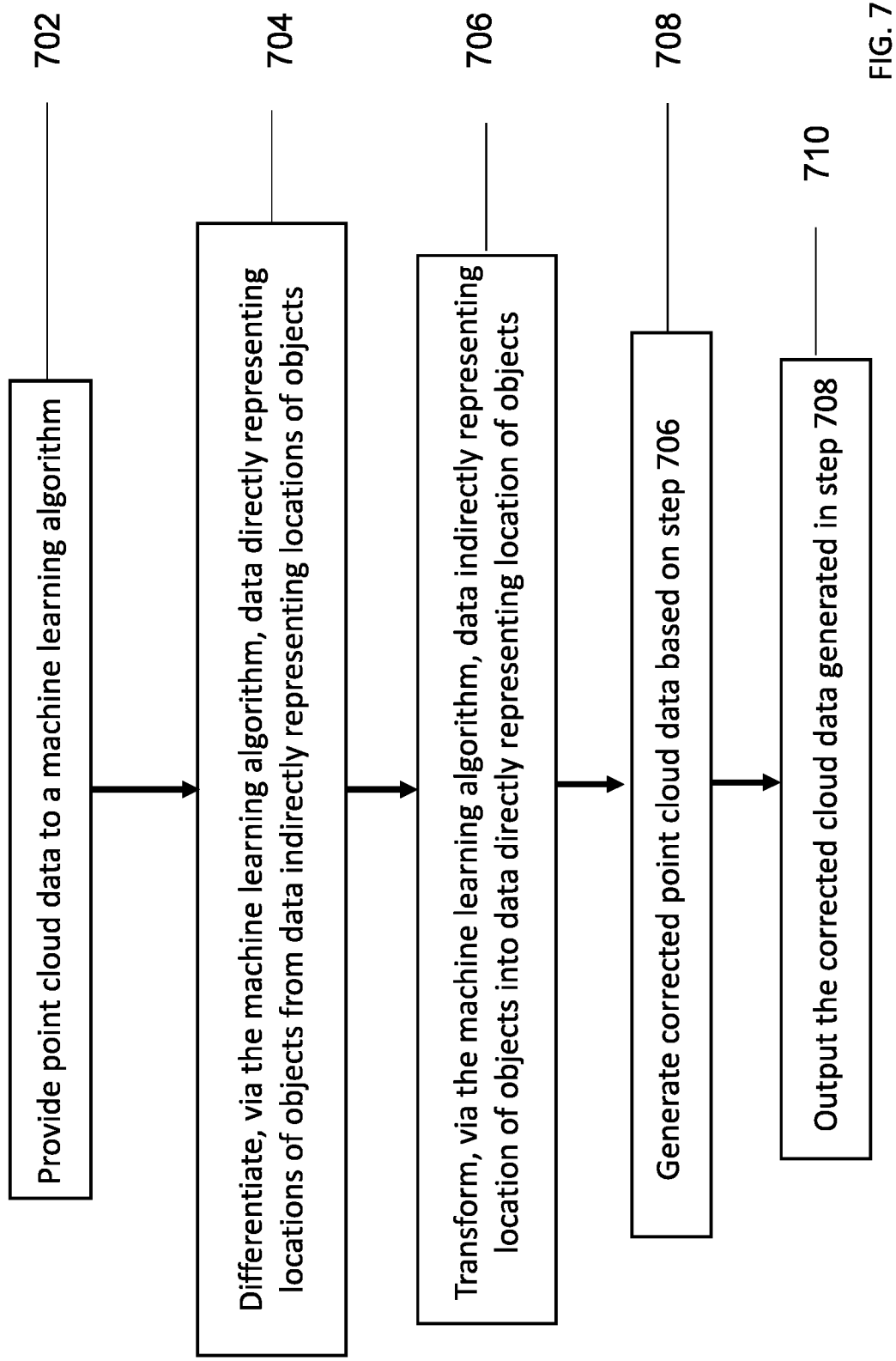
FIG. 7 is a flowchart 700 that implements aspects of the present disclosure.

FIG. 7 is a flowchart 700 that shows implementing aspects of the present disclosure. Although FIG. 7 shows a sequence of steps, it is to be understood that this presentation is not limiting. When appropriate, steps shown in flowchart 700 may be taken in a different order in accordance with this disclosure.

As shown in FIG. 7, in step 702, point cloud data is provided to a machine learning algorithm (e.g., application 306 or 106). The point cloud data can be point cloud data 200 described above in the context of FIG. 2A, for example. Generally, the point cloud data is data obtained via system 101 in the vicinity of an autonomous vehicle (e.g., vehicles 100, 400, or 500). The point cloud data in step 702 has not yet been corrected for reflections. The point cloud data may, therefore, include data representing both single path and multipath reflections from any of the objects in environment 103. This includes, for example, objects of interest 105a-105c, street 107 and still other objects not expressly shown in FIG. 1A (e.g., signs, bridges, overpasses, split driving lanes, etc.). In general, the point cloud data is data suitable for use in navigating the autonomous vehicle (e.g., vehicle 100) through environment 103.

In step 704, the machine learning algorithm (e.g., application 306) differentiates data in the point cloud provided in step 702 that directly represents locations and objects from data in the point cloud that indirectly represents locations of objects. This step is generally performed by employing one of the methods discussed in the context of FIGS. 2B and 2C above to determine first whether any clusters in the point cloud represent multipath reflections. For example, the machine learning algorithm (e.g., application 306) may compare an apparent location of a cluster of points, e.g., cluster 230 in FIGS. 2C and 2D, in the point cloud against locations of known objects in the environment 103. The known objects may include objects of interest 105a-105c or street 107, etc. that are known from previous mapping and/or modeling of environment 103.

If the apparent location of the cluster 230 overlaps or has an unrealistic relationship with the position any one of the known objects from mapping and/or modeling, the cluster 230 may be determined by the machine learning algorithm to be a multipath reflection. One example of such a relationship, as discussed above, is when the machine learning algorithm determines that cluster 230 appears to be unrealistically emanating from street 107 or the location of wall 105a, or even behind will a wall 105a. The machine learning algorithm may track the apparent location of cluster 230 to determine whether it is moving. It may be moving and not located on street 107 (e.g., located behind wall 105a). In that case, machine learning algorithm may determine that it results from a reflection of a signal from a vehicle (e.g., vehicle 105c) that is actually moving along street 107. Here, the machine learning algorithm 106 or 306 may apply other techniques to determine whether cluster 230 represents a multipath reflection. As described above, these other techniques may include using polarimetry to determine a number of reflections, or other indicator, associated with the data and cluster 230. Any of the other techniques for differentiating single path from multipath data described herein may be applied during step 704.

Step 704 may include differentiating several objects based on whether they are detected by system 101 as single or multipath reflections. For example, it may be advantageous in step 704 to characterize all detected objects in environment 103 based whether they represent single or multipath reflections. Alternatively, it may be advantageous to select objects of interest for characterization in this step. For example, the machine learning algorithm 106 or 306 may differentiate objects that could potentially collide with autonomous vehicle 100, 400, or 500 (e.g., objects of interest 105a-105c). It could then determine whether these objects are represented by multipath or single path reflections. Doing so helps navigate autonomous vehicle 100, 400, or 500 around these objects to ensure no collisions occur, for example. Differentiating between objects of interest from objects associated with less interest, may save bandwidth and processing time as autonomous vehicle 100, 400, or 500 navigates environment 103.

At step 706, the machine learning algorithm transforms data from the point cloud 200 that was identified in step 704 as indirectly representing locations of objects (e.g., multipath reflection data). The transformation in this step may, for example, correct the location the detective cluster 230 in feature vector V so that it accurately represents the location of the object from which this reflected cluster emanates. This correction could simply move the location and cluster 230 in the point cloud a distance D (FIGS. 2B and 2C). Doing so would correct its location as the actual location from the object. The exact correction will depend on the specifics of the differentiation in step 704. The differentiation step 704 will show not only that the location is indirect, but also can provide information to determine how to correct the location. Techniques for correcting location may be complicated and involve analysis of the physics of the waveform that is reflected using, for example, polarimetry, as discussed above.

Transformations in step 706 may be performed by any number of methods. For example, one method of transforming or correcting point cloud data that results from multipath reflections using geometrical correction. The geometrical correction can be based on mapping done on environment 103 prior to performance of flowchart 700. It can be based on mapping performed simultaneously or in real time as performing flowchart 700. Relevant information can be acquired from a video feed from other vehicles, for example vehicles in network 600 (FIG. 6). The correction can be performed based on a live feed from the autonomous vehicle 100 of 400, or other autonomous vehicles. If the latter, it can be based on real time tracking of objects environment 103 based on these live feeds.

In step 708, machine learning algorithm generates corrected point cloud data based on the transformations in step 706. More specifically, the machine learning algorithm generates a new point cloud data which includes corrected locations of objects that were indirectly represented via multipath reflections in the original point cloud data provides the machine learning algorithm in step 702. This corrected point cloud data can be used by computing device 150, computing device 300, and computing system 412 the navigating autonomous vehicles 100, 400, and 500.

In step 710, the corrected point cloud data is output. Corrected point cloud data may be output directly to the autonomous vehicle 100, 400, or 500. They may alternatively or in addition the output to computing device 150, computing device 300, and/or computing system 412. In particular, the corrected point cloud may be output to memory 104 or any other memory on the autonomous vehicle 100, 400, or 500 or server in communication with autonomous vehicles 100, 400, or 500. For example, the corrected point cloud data may be output to machine learning application generator 302. In that way, the corrected point cloud data can be used by the generator 302 to generate future iterations of machine learning applications 106, 306, or 502 to drive the autonomous vehicle. According to another example, the corrected point cloud may be output to a perception system (e.g., the perception system 418) such that the perception system can detect object(s) in a driving environment of the autonomous vehicle based on the corrected point cloud data.

Exemplary Computing Device 800

Figure 8:
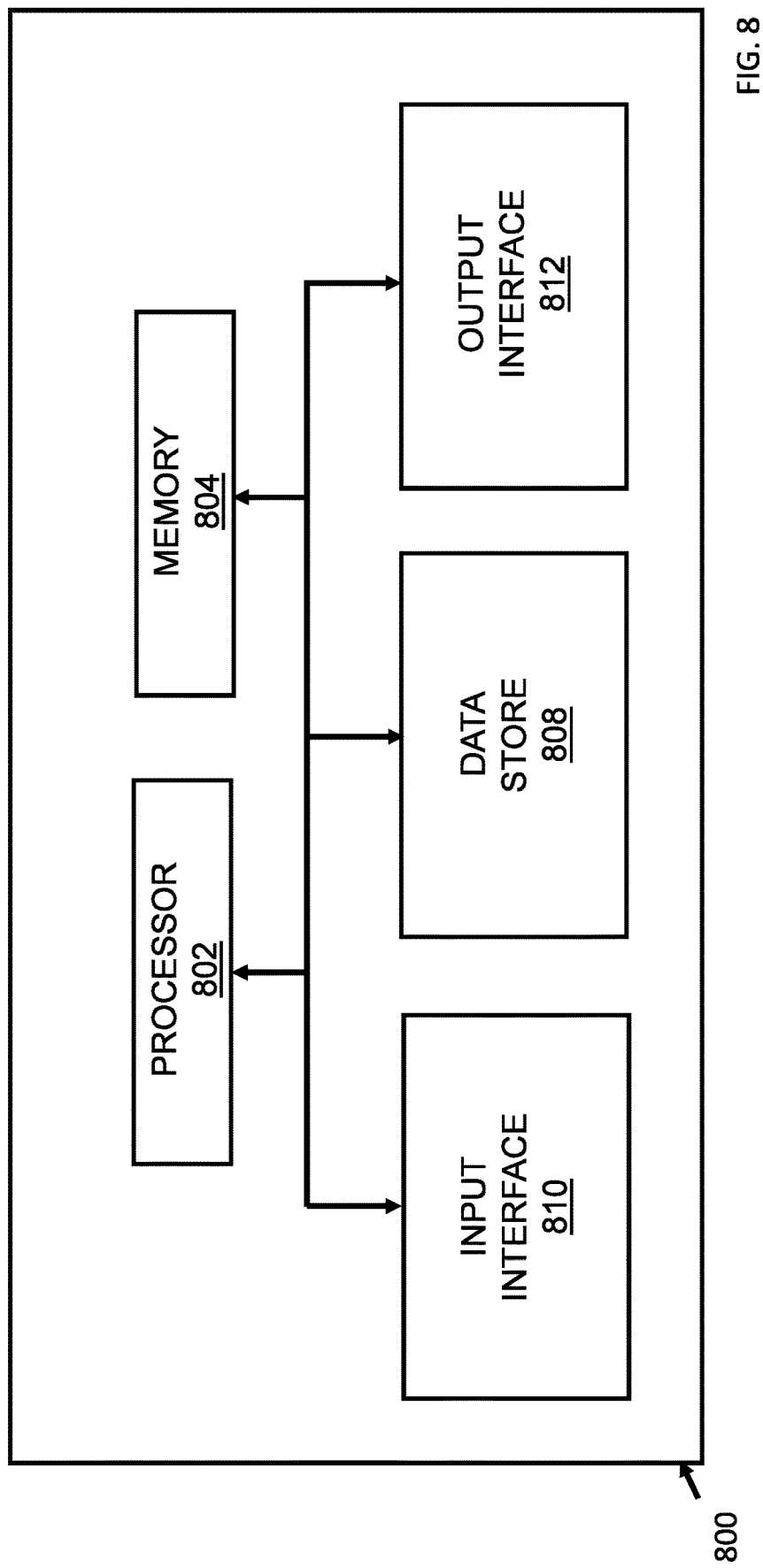
FIG. 8 shows an exemplary computing device 800 that can implement aspects of the present disclosure.

FIG. 8 presents a high-level illustration of an exemplary computing device 800 that can be used in accordance with the systems and methodologies disclosed herein. Computing device 800 may include the computing device 150, computing device 300, or computing system 412.

Computing device 800 includes at least one processor 802 that executes instructions that are stored in a memory 804. The instructions may be, for instance, instructions for implementing functionality described as being carried out by one or more systems discussed above or instructions for implementing one or more of the methods described above. The processor 802 may be a graphics processing unit (GPU), a plurality of GPUs, a central processing unit (CPU), a plurality of CPUs, a multi-core processor, etc. The processor 802 may access the memory 804 by way of a system bus 806. In addition to storing executable instructions, the memory 804 may also store computer-implemented machine learning models, sensor data, labeled sensor data, mapping data, weighted directed graphs, etc.

The computing device 800 additionally includes a data store 808 that is accessible by the processor 802 by way of the system bus 806. The data store 808 may include executable instructions, computer-implemented machine learning applications, sensor data, labeled sensor data, mapping data, weighted directed graphs, etc. The computing device 800 also includes an input interface 810 that allows external devices to communicate with the computing device 800. For instance, the input interface 810 may be used to receive instructions from an external computer device, etc. The computing device 800 also includes an output interface 812 that interfaces the computing device 800 with one or more external devices. For example, the computing device 800 may transmit control signals to the vehicle propulsion system 406, the braking system 408, and/or the steering system 410 by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Systems and methods have been described herein in accordance with at least the examples set forth below.

(A1) In one aspect, a computing device is disclosed herein, where the computing device includes a processor and memory that stores computer-readable instructions that, when executed by the processor, cause the processor to perform acts. The acts include providing point cloud data to a machine learning algorithm, the point cloud data detected in a vicinity of an autonomous vehicle. The acts further include differentiating, via the machine learning algorithm, in the point cloud data: data directly representing a location of a first object; and data indirectly representing a location of a second object. Moreover, the acts include transforming the data indirectly representing the location of the second object into data directly representing the location of the second object. Also, the acts include generating corrected point cloud data based on the data directly representing the location of the first object and the data directly representing the location of the second object. The acts additionally include outputting the corrected point cloud data to the autonomous vehicle.

(A2) In some embodiments of the computing device of (A1), the data directly representing the location of the first object comprises data from a single path reflection of signal reflected from the first object; and the data indirectly representing the location of the second object comprises data from a multipath reflection of signal reflected from the second object.

(A3) In some embodiments of the computing device of (A2), the multipath reflection occurs from interaction of the signal reflected from the second object with at least one of a street, wall, rock, tunnel, ceiling, bridge, or another known object.

(A4) In some embodiments of the computing device of (A3), a location of the at least one of the street, wall, rock, tunnel, ceiling, bridge, or another known object is known via a mapping of the environment of the autonomous vehicle from which the point cloud is generated.

(A5) In some embodiments of the computing device of (A4), the mapping is determined at least in part via direct measurement of the environment of the autonomous vehicle from which the point cloud is generated.

(A6) In some embodiments of at least one of the computing devices of (A4)-(A5), the mapping is determined at least in part via video data generated by autonomous vehicles traversing the environment of the autonomous vehicle from which the point cloud is generated.

(A7) In some embodiments of at least one of the computing devices of (A4)-(A6), the mapping is determined at least in part via radar data generated by autonomous vehicles traversing the environment of the autonomous vehicle from which the point cloud is generated.

(A8) In some embodiments of at least one of the computing devices of (A4)-(A7), the mapping includes labeled data.

(A9) In some embodiments of the computing device of (A8), the labeled data includes labeling to distinguish single and multipath reflections.

(A10) In some embodiments of at least one of the computing devices of (A4)-(A9), the acts further comprise training the machine learning algorithm to: differentiate data directly representing object locations from data indirectly representing object locations based on the mapping; and transform the detected data indirectly representing object locations into data directly representing objection locations based on the mapping.

(A11) In some embodiments of the computing device of (A10), the transforming the detected data indirectly representing object locations into data directly representing objection locations comprises a geometrical correction.

(A12) In some embodiments of at least one of the computing devices of (A10)-(A11), the data directly representing objection locations is obtained via a live feed from the autonomous vehicle.

(A13) In some embodiments of at least one of the computing devices of (A4)-(A12), the acts further comprise: tracking motion of an apparent location of a point in the point cloud; differentiating data directly representing object locations from data indirectly representing object locations based on the tracking; and transforming the detected data indirectly representing object locations into data directly representing objection locations based on the tracking.

(A14) In some embodiments of the computing device of (A13), the transforming the detected data indirectly representing object locations into data directly representing objection locations comprises a geometrical correction based on the tracking.

(A15) In some embodiments of at least one of the computing devices of (A13)-(A14), the transforming the detected data indirectly representing object locations into data directly representing objection locations comprises a geometrical correction based on the mapping.

(A16) In some embodiments of at least one of the computing devices of (A1)-(A15), the machine learning algorithm includes a graph neural network.

(A17) In some embodiments of at least one of the computing devices of (A1)-(A16), the machine learning algorithm includes at least one of an artificial neutral network (ANN), a deep neural network (DNN), a recurrent neural network (RNN), a long short-term memory (LSTM) RNN, a convolutional neural network (CNN), a support vector machine (SVM), a Bayesian classifier, a decision tree, or a random forest.

(B1) In another aspect, a method is disclosed herein. The method includes providing point cloud data to a machine learning algorithm, the point cloud data detected in the vicinity of an autonomous vehicle. Further, the method includes differentiating, via the machine learning algorithm, in the point cloud data: data directly representing a location of a first object; and data indirectly representing a location of a second object. Moreover, the method includes transforming the data indirectly representing the location of the second object into data directly representing the location of the second object. The method also includes generating corrected point cloud data based on the data directly representing the location of the first object and the data directly representing the location of the second object. The method additionally includes outputting the corrected point cloud data to the autonomous vehicle.

(B2) In some embodiments of the method of (B1), the data directly representing the location of the first object comprises data from a single path reflection of signal reflected from the first object; and the data indirectly representing the location of the second object comprises data from a multipath reflection of signal reflected from the second object.

(C1) In yet another aspect, an autonomous vehicle is disclosed herein. The autonomous vehicle includes a radar sensor system configured to generate point cloud data in a vicinity of the autonomous vehicle and a computing device in communication with the radar sensor system. The computing device includes a processor and memory that stores computer-readable instructions that, when executed by the processor, cause the processor to perform acts. The acts include providing the point cloud data generated by the radar sensor system to a machine learning algorithm. The acts also include differentiating, via the machine learning algorithm, in the point cloud data: data directly representing a location of a first object; and data indirectly representing a location of a second object. The acts further include transforming the data indirectly representing the location of the second object into data directly representing the location of the second object. Moreover, the acts include generating corrected point cloud data based on the data directly representing the location of the first object and the data directly representing the location of the second object. The acts also include maneuvering the autonomous vehicle based on the corrected point cloud.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computer-implemented method comprising:
   generating, based on real-world autonomous vehicle (AV) scene data captured by sensors of an AV during a real-world scenario, a simulation of the real-world scenario;
   adding a first object to the simulation of the real-world scenario;
   determining, using polarimetry analysis of received signals, a number of signal reflections associated with data indirectly representing the first object;
   transforming the data indirectly representing the first object based on the number of signal reflections;
   generating synthetic AV scene data based on the transformed data and the simulation of the real-world scenario, including the first object; and
   augmenting the real-world AV scene data with a portion of the synthetic AV scene data that describes the first object, resulting in augmented real-world AV scene data that describes the real-world scenario, including the first object.

2. The computer-implemented method of claim 1, further comprising training a machine learning model based on the augmented real-world AV scene data.

3. The computer-implemented method of claim 1, wherein augmenting the real-world AV scene data with the portion of the synthetic AV scene data that describes the first object comprises:
   identifying a first synthetic data point in the portion of the synthetic AV scene data, the first synthetic data point being associated with a first synthetic distance value indicating a distance of the first synthetic data point from a position of the AV within the simulation of the real-world scenario;
   identifying a first real-world data point in the real-world AV scene data that corresponds to the first synthetic data point, the first real-world data point being associated with a first real-world distance value indicating a distance of the first real-world data point from a position of the AV within the real-world scenario; and modifying the real-world AV scene data based on a comparison of the first synthetic distance value to the first real-world distance value.

4. The computer-implemented method of claim 3, wherein modifying the real-world AV scene data based on the comparison of the first synthetic distance value to the first real-world distance value comprises replacing the first real-world data point with the first synthetic data point based on determining that the first synthetic distance value is less than the first real-world distance value.

5. The computer-implemented method of claim 3, wherein modifying the real-world AV scene data based on the comparison of the first synthetic distance value to the first real-world distance value comprises maintaining the first real-world data point based on determining that the first synthetic distance value is less than the first real-world distance value.

6. The computer-implemented method of claim 3, wherein augmenting the real-world AV scene data with the portion of the synthetic AV scene data that describes the first object further comprises:
  identifying a second synthetic data point in the portion of the synthetic AV scene data, the second synthetic data point being associated with a second synthetic distance value indicating a distance of the second synthetic data point from the position of the AV within the simulation of the real-world scenario;
  identifying a second real-world data point in the real-world AV scene data that corresponds to the second synthetic data point, the second real-world data point being associated with a second real-world distance value indicating a distance of the second real-world data point from the position of the AV within the real-world scenario; and
  modifying the real-world AV scene data based on a comparison of the second synthetic distance value to the second real-world distance value.

7. The computer-implemented method of claim 1, further comprising:
  adding a second object to the simulation of the real-world scenario; and
  augmenting the real-world AV scene data with a portion of the synthetic AV scene data that describes the second object.

8. A system comprising:
  one or more computer processors; and
  one or more computer-readable mediums storing instructions that, when executed by the one or more computer processors, cause the system to perform operations comprising:
  generating, based on real-world autonomous vehicle (AV) scene data captured by sensors of an AV during a real-world scenario, a simulation of the real-world scenario;
  adding a first object to the simulation of the real-world scenario;
  determining, using polarimetry analysis of received signals, a number of signal reflections associated with data indirectly representing the first object;
  transforming the data indirectly representing the first object based on the number of signal reflections;
  generating synthetic AV scene data based on the transformed data and the simulation of the real-world scenario including the first object; and
  augmenting the real-world AV scene data with a portion of the synthetic AV scene data that describes the first object, resulting in augmented real-world AV scene data that describes the real-world scenario including the first object.

9. The system of claim 8, the operations further comprising training a machine learning model based on the augmented real-world AV scene data.

10. The system of claim 8, wherein augmenting the real-world AV scene data with the portion of the synthetic AV scene data that describes the first object comprises:
  identifying a first synthetic data point in the portion of the synthetic AV scene data, the first synthetic data point being associated with a first synthetic distance value indicating a distance of the first synthetic data point from a position of the AV within the simulation of the real-world scenario;
  identifying a first real-world data point in the real-world AV scene data that corresponds to the first synthetic data point, the first real-world data point being associated with a first real-world distance value indicating a distance of the first real-world data point from a position of the AV within the real-world scenario; and
  modifying the real-world AV scene data based on a comparison of the first synthetic distance value to the first real-world distance value.

11. The system of claim 10, wherein modifying the real-world AV scene data based on the comparison of the first synthetic distance value to the first real-world distance value comprises replacing the first real-world data point with the first synthetic data point based on determining that the first synthetic distance value is less than the first real-world distance value.

12. The system of claim 10, wherein modifying the real-world AV scene data based on the comparison of the first synthetic distance value to the first real-world distance value comprises maintaining the first real-world data point based on determining that the first synthetic distance value is less than the first real-world distance value.

13. The system of claim 10, wherein augmenting the real-world AV scene data with the portion of the synthetic AV scene data that describes the first object further comprises:
  identifying a second synthetic data point in the portion of the synthetic AV scene data, the second synthetic data point being associated with a second synthetic distance value indicating a distance of the second synthetic data point from the position of the AV within the simulation of the real-world scenario;
  identifying a second real-world data point in the real-world AV scene data that corresponds to the second synthetic data point, the second real-world data point being associated with a second real-world distance value indicating a distance of the second real-world data point from the position of the AV within the real-world scenario; and
  modifying the real-world AV scene data based on a comparison of the second synthetic distance value to the second real-world distance value.

14. The system of claim 8, the operations further comprising:
  adding a second object to the simulation of the real-world scenario; and
  augmenting the real-world AV scene data with a portion of the synthetic AV scene data that describes the second object.

15. A non-transitory computer-readable medium storing instructions that, when executed by one or more computer processors of one or more computing devices, cause the one or more computing devices to perform operations comprising:
- generating, based on real-world autonomous vehicle (AV) scene data captured by sensors of an AV during a real-world scenario, a simulation of the real-world scenario;
- adding a first object to the simulation of the real-world scenario;
- determining, using polarimetry analysis of received signals, a number of signal reflections associated with data indirectly representing the first object;
- transforming the data indirectly representing the first object based on the number of signal reflections;
- generating synthetic AV scene data based on the transformed data and the simulation of the real-world scenario including the first object; and
- augmenting the real-world AV scene data with a portion of the synthetic AV scene data that describes the first object, resulting in augmented real-world AV scene data that describes the real-world scenario including the first object.

16. The non-transitory computer-readable medium of claim 15, the operations further comprising training a machine learning model based on the augmented real-world AV scene data.

17. The non-transitory computer-readable medium of claim 15, wherein augmenting the real-world AV scene data with the portion of the synthetic AV scene data that describes the first object comprises:
- identifying a first synthetic data point in the portion of the synthetic AV scene data, the first synthetic data point being associated with a first synthetic distance value indicating a distance of the first synthetic data point from a position of the AV within the simulation of the real-world scenario;
- identifying a first real-world data point in the real-world AV scene data that corresponds to the first synthetic data point, the first real-world data point being associated with a first real-world distance value indicating a distance of the first real-world data point from a position of the AV within the real-world scenario; and
- modifying the real-world AV scene data based on a comparison of the first synthetic distance value to the first real-world distance value.

18. The non-transitory computer-readable medium of claim 17, wherein modifying the real-world AV scene data based on the comparison of the first synthetic distance value to the first real-world distance value comprises replacing the first real-world data point with the first synthetic data point based on determining that the first synthetic distance value is less than the first real-world distance value.

19. The non-transitory computer-readable medium of claim 17, wherein modifying the real-world AV scene data based on the comparison of the first synthetic distance value to the first real-world distance value comprises maintaining the first real-world data point based on determining that the first synthetic distance value is less than the first real-world distance value.

20. The non-transitory computer-readable medium of claim 17, wherein augmenting the real-world AV scene data with the portion of the synthetic AV scene data that describes the first object further comprises:
- identifying a second synthetic data point in the portion of the synthetic AV scene data, the second synthetic data point being associated with a second synthetic distance value indicating a distance of the second synthetic data point from the position of the AV within the simulation of the real-world scenario;
- identifying a second real-world data point in the real-world AV scene data that corresponds to the second synthetic data point, the second real-world data point being associated with a second real-world distance value indicating a distance of the second real-world data point from the position of the AV within the real-world scenario; and
- modifying the real-world AV scene data based on a comparison of the second synthetic distance value to the second real-world distance value.

* * * * *